US011962979B2

(12) United States Patent
Hillström et al.

(10) Patent No.: US 11,962,979 B2
(45) Date of Patent: Apr. 16, 2024

(54) DYNAMIC FITTING FOR DEVICE WORN ON RECIPIENT'S BODY

(71) Applicant: Cochlear Limited, Macquarie University (AU)

(72) Inventors: Per Hillström, Molnlycke (SE); Kristian Gunnar Asnes, Molndal (SE)

(73) Assignee: Cochlear Limited, Macquarie University (AU)

(*) Notice: Subject to any disclaimer, the term of this patent is extended or adjusted under 35 U.S.C. 154(b) by 0 days.

(21) Appl. No.: 18/296,635

(22) Filed: Apr. 6, 2023

(65) Prior Publication Data

US 2023/0319496 A1 Oct. 5, 2023

Related U.S. Application Data

(63) Continuation of application No. 17/660,568, filed on Apr. 25, 2022, now Pat. No. 11,653,160, which is a continuation of application No. 17/257,815, filed as application No. PCT/IB2019/056505 on Jul. 30, 2019, now Pat. No. 11,330,381.

(60) Provisional application No. 62/715,185, filed on Aug. 6, 2018.

(51) Int. Cl.
*H04R 25/00* (2006.01)

(52) U.S. Cl.
CPC ....... *H04R 25/606* (2013.01); *H04R 2460/13* (2013.01)

(58) Field of Classification Search
CPC .............. H04R 25/606; H04R 2460/13; H04R 1/1066; H04R 25/604; H04R 3/002; H04R 25/608; H04R 25/658
See application file for complete search history.

(56) References Cited

U.S. PATENT DOCUMENTS

| | | | | |
|---|---|---|---|---|
| 2011/0194721 | A1 | 8/2011 | Schmidt et al. | |
| 2013/0089229 | A1 | 4/2013 | Kristo et al. | |
| 2015/0163579 | A1* | 6/2015 | Kristo .................. | H04R 25/606 381/322 |
| 2016/0302013 | A1 | 10/2016 | Andersson | |
| 2018/0077505 | A1* | 3/2018 | Bern .................... | H04R 25/606 |
| 2021/0297794 | A1 | 9/2021 | Hillstrom et al. | |

FOREIGN PATENT DOCUMENTS

| | | |
|---|---|---|
| CN | 102611957 A | 7/2012 |
| KR | 10-0974153 B1 | 8/2010 |

OTHER PUBLICATIONS

International Search Report and Written Opinion, PCT Application No. PCT/IB2019/056505, dated Dec. 24, 2019.

* cited by examiner

*Primary Examiner* — Amir H Etesam
(74) *Attorney, Agent, or Firm* — Knobbe, Martens, Olson & Bear, LLP

(57) ABSTRACT

An apparatus includes a support configured to be worn on a head of a recipient and to hold at least one device next to the recipient's skull. The at least one device provides information to the recipient. The support is configured to generate a force that presses against the head and to actively adjust the force while the support is worn by the recipient.

24 Claims, 15 Drawing Sheets

DYNAMIC FITTING FOR DEVICE WORN ON RECIPIENT'S BODY

CLAIM OF PRIORITY

The present application is a continuation of U.S. patent application Ser. No. 17/660,568 filed Apr. 25, 2022 which is a continuation of U.S. patent application Ser. No. 17/257,815 filed Jan. 4, 2021 which is a U.S. national stage filing of PCT Appl. No. PCT/IB2019/056505 filed Jul. 30, 2019 which claims the benefit of priority to U.S. Provisional Appl. No. 62/715,185 filed Aug. 6, 2018, each of which is incorporated in its entirety by reference herein.

BACKGROUND

Field

The present application relates generally to bone conduction auditory prostheses, and more specifically systems and methods for pressing external actuators of such auditory prostheses against the head of the recipient.

Description of the Related Art

Hearing loss, which may be due to many different causes, is generally of two types, conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As a result, individuals suffering from conductive hearing loss might receive an auditory prosthesis that generates mechanical motion of the cochlea fluid instead of a hearing aid based on the type of conductive loss, amount of hearing loss and customer preference. Such prostheses include, for example, bone conduction devices and direct acoustic stimulators.

Bone conduction devices mechanically transmit sound information to a recipient's cochlea by transferring vibrations to a person's skull, enabling the hearing prosthesis to be effective regardless of whether there is disease or damage in the middle ear. Traditionally, bone conduction devices transfer vibrations from an external actuator (e.g., vibrator) to the skull, e.g., through a percutaneous bone conduction implant that penetrates the skin and is physically attached to both the actuator and the skull. Typically, the external actuator is connected to the percutaneous bone conduction implant located behind the outer ear facilitating the efficient transfer of sound via the skull to the cochlea. The bone conduction implant connecting the actuator to the skull generally comprises two components: a bone attachment piece (e.g., bone fixture/fixture) that is attached or implanted directly to the skull, and a skin-penetrating piece attached to the bone attachment piece, commonly referred to as an abutment.

SUMMARY

In one aspect disclosed herein, an apparatus is provided. The apparatus comprises a support configured to be worn on a head of a recipient and to hold at least one bone conduction device next to the recipient's skull. The at least one bone conduction device provides auditory stimulation to the recipient. The support is configured to generate a force that presses against the head and to actively adjust the force while the support is worn by the recipient.

In another aspect disclosed herein, an apparatus is provided. The apparatus comprises a structure configured to be worn on a head of a recipient and to press at least one bone conduction actuator against the head such that vibrations generated by the at least one bone conduction actuator are transmitted through skin of the recipient at a location where the skin covers a temporal bone of the recipient. The structure comprises at least one adjustment mechanism configured to adjust at least one of a length and a shape of the structure without mechanical manipulation of the at least one adjustment mechanism.

In another aspect disclosed herein, a method is provided. The method comprises providing at least one vibration generator configured to be worn on a head of a recipient and to transmit vibrations indicative of auditory information. The method further comprises, in response to control signals, while the at least one vibration generator is worn by the recipient, modifying a static component of a force applied by the at least one vibration generator to the head.

BRIEF DESCRIPTION OF THE DRAWINGS

Embodiments are described herein in conjunction with the accompanying drawings, in which.

DETAILED DESCRIPTION

For non-invasive or non-surgical bone conduction auditory prostheses, the transmission of auditory stimulation from the bone conduction auditory prosthesis to the recipient via the recipient's skin is dependent at least in part on the force with which the auditory prosthesis is pressed against the recipient's skin. While larger forces are generally conducive to better sound quality (e.g., better transmission of the auditory stimulation), the higher forces can be less comfortable to the recipient, and, when applied for excessively long periods of time, can result in injury to the recipient's skin. Certain embodiments described herein actively (e.g., dynamically) adjust the force while the auditory prosthesis is worn by the recipient in a "hands-free" manner. The active adjustment of the force is in response at least in part to detected operational conditions, including but not limited to the categories of auditory information being provided to the recipient via the auditory stimulation (e.g., speech, music, noise, the recipient's name, etc.), to increase the force during some operational conditions warranting better sound quality and to decrease the force during other operational conditions that do not warrant better sound quality.

Figure 1A:
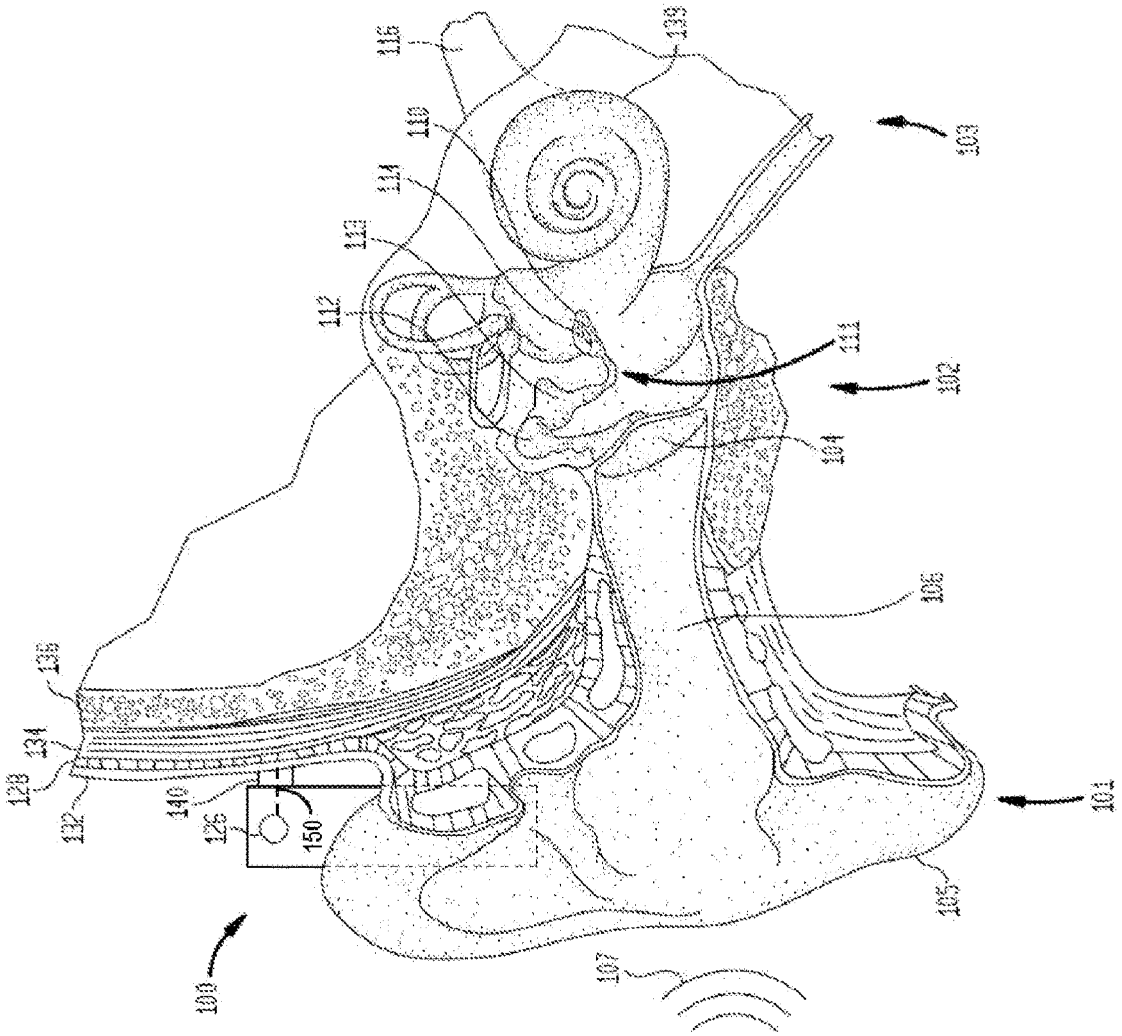
FIG. 1A is a perspective view of an example bone conduction auditory prosthesis in accordance with certain embodiments described herein.
Figure 1B:
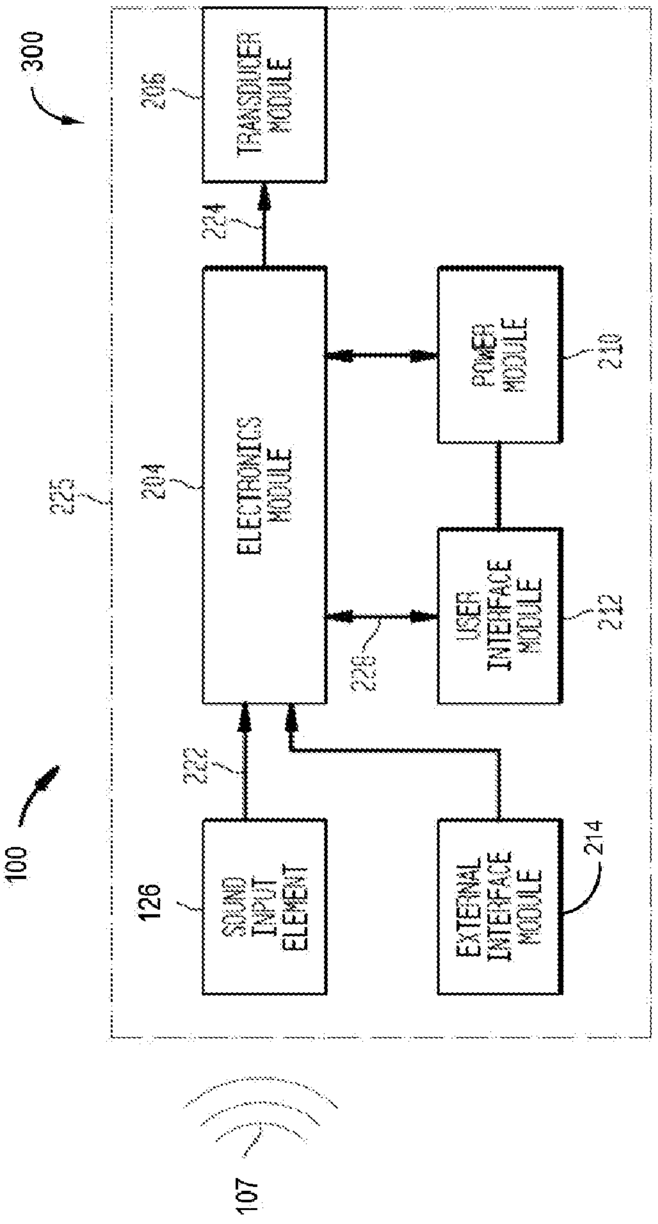
FIG. 1B is a functional block diagram of an example bone conduction auditory prosthesis in accordance with certain embodiments described herein.
Figure 1C:
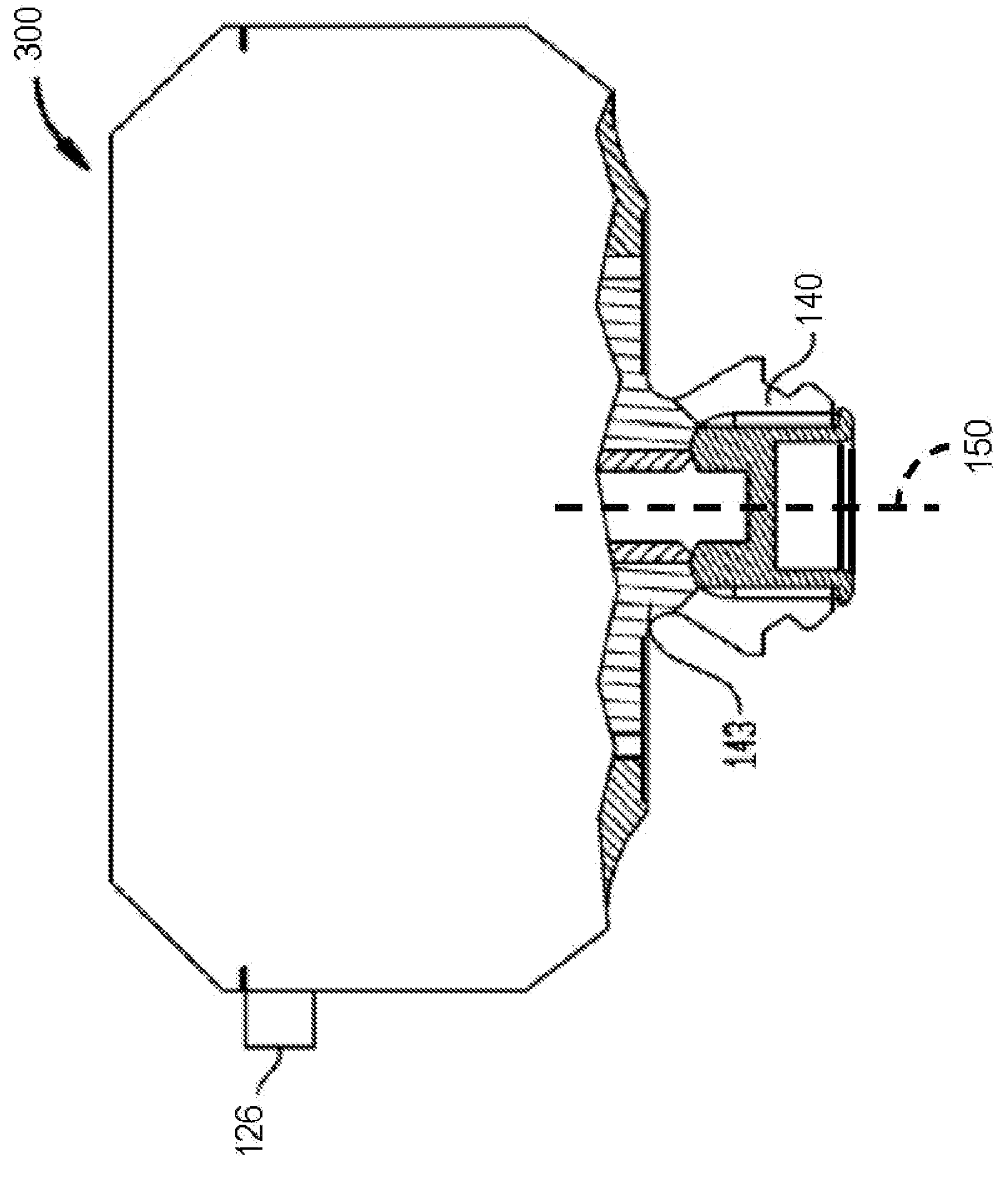
FIG. 1C schematically illustrates an operationally removable component of an example bone conduction auditory prosthesis in accordance with certain embodiments described herein.

FIG. 1A is a perspective view of an example bone conduction auditory prosthesis 100 in accordance with certain embodiments described herein. FIG. 1B is a functional block diagram of an example bone conduction auditory prosthesis 100 in accordance with certain embodiments described herein. FIG. 1C schematically illustrates an operationally removable component 300 of an example bone conduction auditory prosthesis 100 in accordance with certain embodiments described herein.

As shown in FIG. 1A, the recipient has an outer ear 101, a middle ear 102, and an inner ear 103. Elements of the outer ear 101, the middle ear 102, and the inner ear 103 are described below, followed by a description of the auditory prosthesis 100. In a fully functional human hearing anatomy, the outer ear 101 comprises an auricle 105 and an ear canal 106. A sound wave or acoustic pressure 107 is collected by the auricle 105 and channeled into and through the ear canal 106. Disposed across the distal end of the ear canal 106 is a tympanic membrane 104 which vibrates in response to the acoustic wave 107. This vibration is coupled to the oval window or fenestra ovalis 110 through three bones of the middle ear 102, collectively referred to as the ossicles 111 and comprising the malleus 112, the incus 113, and the stapes 114. The ossicles 111 of the middle ear 102 serve to filter and amplify the acoustic wave 107, causing the oval window 110 to vibrate. Such vibrations set up waves of fluid motion within the cochlea 139. Such fluid motion, in turn, activates hair cells (not shown) that line the inside of the cochlea 139. Activation of the hair cells causes appropriate nerve impulses to be transferred through the spiral ganglion cells and the auditory nerve 116 to the brain (not shown), where they are perceived as sound.

FIG. 1A also illustrates an example positioning of the auditory prosthesis 100 relative to the outer ear 101, the middle ear 102, and the inner ear 103 of a recipient of the auditory prosthesis 100. As shown in FIG. 1A, the auditory prosthesis 100 is positioned behind the outer ear 101 of the recipient and comprises a sound input element 126 to receive sound signals. The sound input element 126 can comprise, for example, a microphone, telecoil, etc. and can be located, for example, on or in the auditory prosthesis 100, or on a cable extending from the auditory prosthesis 100.

In certain embodiments, the auditory prosthesis 100 comprises an operationally removable component 300, as schematically illustrated by FIGS. 1B and 1C. By operationally removable, it is meant that the component 300 is releasably coupled to the recipient's head and/or any support holding the component 300 in such a manner that the recipient can relatively easily connect the operationally removable component 300 to the recipient's head and/or the support and can relatively easily remove the operationally removable component 300 from the recipient's head and/or the support during normal use of the auditory prosthesis 100, repeatedly if desired. The operationally removable component 300 of the auditory prosthesis 100 further includes a coupling apparatus 140 (e.g., having a longitudinal axis 150). In certain embodiments, the coupling apparatus 140 is configured to be pressed directly against the recipient's head and to transmit acoustic vibrations to the recipient's head, while in certain other embodiments, the coupling apparatus 140 is configured to mate with a corresponding mating apparatus of the support and to transmit acoustic vibrations to the recipient's head (e.g., via the support).

The operationally removable component 300 includes the sound input element 126, a sound processor (e.g., an electronics module 204 as shown in FIG. 1B), and an actuator 206 (e.g., a transducer module, as shown in FIG. 1B) configured to generate acoustic vibrations. The actuator 206 can comprise a vibrator (e.g., a vibrating electromagnetic actuator; a vibrating piezoelectric actuator; other type of vibrating actuator), and the operationally removable component 300 is sometimes referred to herein as a vibrator unit. More particularly, the sound input element 126 (e.g., a microphone) converts received sound signals 107 into electrical signals 222. Alternatively, sound signals 107 are received by the sound input element 126 as electrical signals (e.g., via a cable or wireless connection, such as from an audiovisual device). The electrical signals 222 from the sound input element 126 are processed by the electronics module 204, which can include a sound processing circuit, control electronics, transducer drive components, and a variety of other elements.

The electronics module 204 is configured to respond to the electrical signals 222 by generating control signals 224 which cause the actuator 206 to vibrate, generating a mechanical output force in the form of acoustic vibrations that are delivered to the skull of the recipient through the skin (e.g., via the coupling apparatus 140). In other words, the operationally removable component 300 converts the received sound signals 107 into mechanical motion using the actuator 206 to impart vibrations to the recipient's skull (e.g., via the recipient's skin). Delivery of this output force causes motion or vibration of the recipient's skull, thereby activating the hair cells in the recipient's cochlea 139 via cochlea fluid motion.

As shown in FIG. 1B, the operationally removable component 300 can further comprise a power module 210 configured to provide electrical power to one or more components of the auditory prosthesis 100. For ease of illustration, the power module 210 has been shown connected only to user interface module 212 and the electronics module 204. However, it should be appreciated that the power module 210 can be used to supply power to any electrically powered circuits/components of the auditory prosthesis 100. The user interface module 212 is configured to allow the recipient to interact with the auditory prosthesis 100. For example, the user interface module 212 can allow the recipient to adjust the volume, alter the speech processing strategies, power on/off the device, etc. In the example of FIG. 1B, the user interface module 212 communicates with the electronics module 204 via the signal line 228. The auditory prosthesis 100 of certain embodiments further includes an external interface module 214 configured to connect the electronics module 204 to an external device, such as a fitting system. Using the external interface module 214, the operationally removable component 300 can obtain information from the auditory prosthesis 100 (e.g., the current parameters, data, alarms, etc.) and/or modify the parameters of the auditory prosthesis 100 used in processing received sounds and/or performing other functions.

In the example of FIG. 1B, the sound input element 126, the electronics module 204, the actuator 206 (e.g., transducer module), the power module 210, the user interface module 212, and the external interface module 214 have been shown as integrated in a single housing 225. However, it should be appreciated that in certain examples, one or more of the illustrated components can be housed in separate or different housings. For example, in some embodiments, the actuator 206 and the sound input element 126 are housed in separate housings to eliminate a potential pathway for feedback. The sound input element 126, the electronics module 204, the power module 210, the user interface module 212, and the external interface module 214 can be housed in a behind-the-ear (BTE) component that is suspended from the pinna (e.g., by an ear hook). Similarly, it should also be appreciated that in certain such embodiments, direct connections between the various modules and devices are not necessary and that the components can communicate, for example, via wireless connections.

FIG. 1C depicts a side view of an operationally removable component 300 of an example bone conduction auditory prosthesis 100 in accordance with certain embodiments described herein. The example operationally removable component 300 of FIG. 1C comprises the actuator 206 and the coupling apparatus 140 with a longitudinal axis 150 (e.g., an axis along a length of the coupling apparatus 140; an axis about which the coupling apparatus 140 is at least partially symmetric). The coupling apparatus 140 is mechanically coupled, via the mechanical coupling shaft 143, to the actuator 206 within the component 300. The coupling apparatus 140 is configured to be mated to a corresponding mating structure of the support (not shown) by pressing the coupling apparatus 140 against the mating structure in a direction along the longitudinal axis 150 (e.g., snap-coupled). In certain embodiments, the operationally removable component 300 is directly vibrationally connected to and removably coupled to the recipient's skull via the coupling apparatus 140, while in certain other embodiments, the operationally removable component 300 is directly vibrationally connected to and removably coupled to the support via the coupling apparatus 140, and the support is directly vibrationally connected to and removably coupled to the recipient's skull.

Acoustic vibrations from the actuator 206 are transferred from the actuator 206 to the coupling apparatus 140 and then to the recipient (e.g., via the support). More particularly, the actuator 206 of the operationally removable component 300 is in vibrational communication with the coupling apparatus 140 such that vibrations generated by the actuator 206, in response to a sound captured by the sound input element 126, are transmitted to the coupling apparatus 140 and then to the recipient (e.g., via the support) in a manner that at least effectively evokes hearing percept. By "effectively evokes a hearing percept," it is meant that the vibrations are such that a typical human between 18 years old and 40 years old having a fully functioning cochlea receiving such vibrations, where the vibrations communicate speech, would be able to understand the speech communicated by those vibrations in a manner sufficient to carry on a conversation provided that those adult humans are fluent in the language forming the basis of the speech. In certain embodiments, the vibrational communication effectively evokes a hearing percept, if not a functionally utilitarian hearing percept.

In certain embodiments, the coupling apparatus 140 comprises a male component and the mating structure of the support comprises a female component configured to mate with the male component of the coupling apparatus 140. In certain embodiments, this configuration can be reversed, with the coupling apparatus 140 comprises a female component and the mating structure of the support comprises a male component configured to mate with the female component of the coupling apparatus 140. While FIG. 1C illustrates one example component 300 in accordance with certain embodiments described herein, other components 300 (e.g., comprising a coupling apparatus 140 configured to contact the recipient's skin, or any other coupling apparatus 140 of any type, size/having any geometry) are also compatible with certain embodiments described herein.

FIGS. 2A-2E schematically illustrate various views of an example apparatus 400 in accordance with certain embodiments described herein. FIGS. 3, 4A-4D, 5A-5D, and 6 schematically illustrate other example apparatuses 400 in accordance with certain embodiments described herein. The apparatus 400 comprises a support 410 configured to be worn on a head of a recipient and to hold at least one bone conduction device 420 next to the recipient's skull. The at least one bone conduction device 420 provides auditory stimulation to the recipient. The support 410 is configured to generate a force that presses against the head and to actively (e.g., dynamically) adjust the force while the support 410 is worn by the recipient.

In certain embodiments, the apparatus 400 is configured to be used in conjunction with a bone conduction auditory prosthesis system comprising at least one bone conduction device 420 (e.g., at least one bone conduction actuator; at least one operationally removable component 300; at least one sound processor device; at least one vibration generator) configured to provide auditory stimulation to the recipient by generating acoustic vibrations and applying the acoustic vibrations to the recipient's skull via the recipient's skin. The at least one bone conduction device 420 of certain embodiments is wholly external to the recipient and is configured to be used non-invasively or non-surgically (e.g., without the use of surgically implanted portions such as a fixture and an abutment as utilized in percutaneous bone conduction auditory prostheses).

For non-invasive or non-surgical bone conduction auditory prostheses, the transmission of auditory stimulation from the at least one bone conduction device 420 to the recipient via the recipient's skin is dependent at least in part on the force with which the at least one bone conduction device 420 is pressed against the recipient's skin. While larger forces are generally conducive to better sound quality (e.g., better transmission of the auditory stimulation), the higher forces can be less comfortable to the recipient, and, when applied for excessively long periods of time, can result in injury to the recipient's skin. In certain embodiments, the apparatus 400 is configured to actively adjust the force applied to the recipient's skin between at least two values including but not limited to: a first value corresponding to a force sufficient to hold the support 410 on the recipient's head (e.g., a retention value; a lower bound value; a "loose" fit value) and a second value larger than the first value, the second value corresponding to a force beyond which the recipient would not be expected to perceive any improvement of the sound quality from the auditory prosthesis (e.g., a saturation value; an upper bound value; a "tight" fit value). Examples of the second value of the force include but are not limited to: 3 newtons per square centimeter multiplied by the area of contact with the recipient's skin; force level obtained from "International Organization for Standardization No. 389-3 *"Acoustics—Reference zero for the calibration of audiometric equipment—Part 3: Reference equivalent threshold vibratory force levels for pure tones and bone vibrators,"* 2016).

Figure 2A:
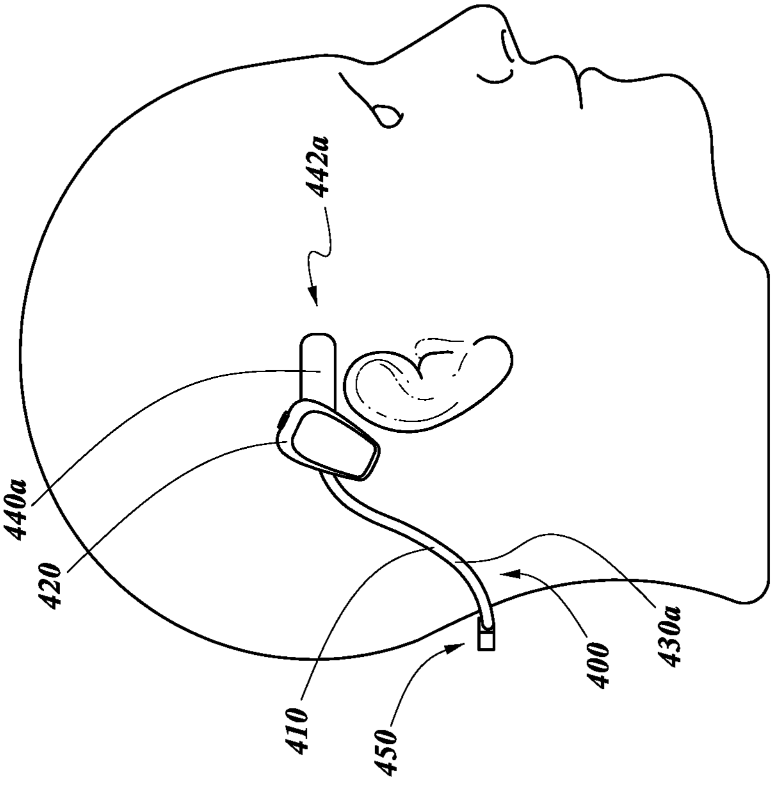
FIGS. 2A-2E schematically illustrate various views of an example apparatus in accordance with certain embodiments described herein.
Figure 2B:
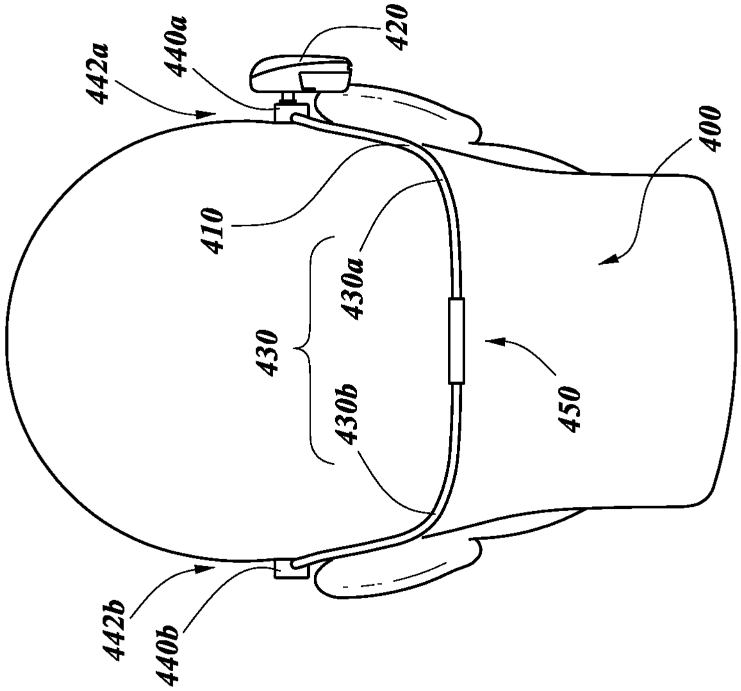
Figure 2D:
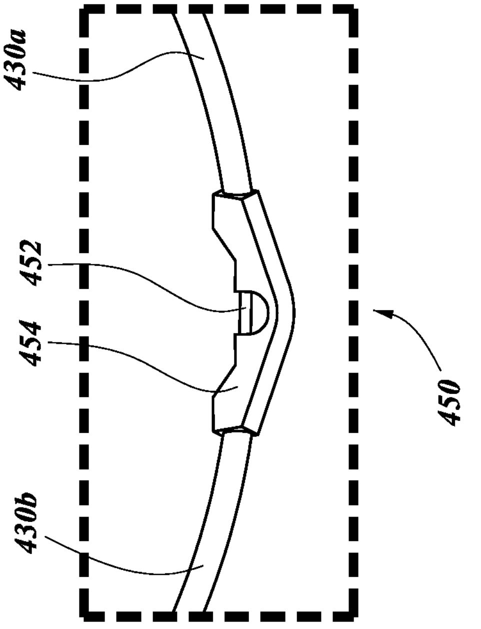
Figure 2C:
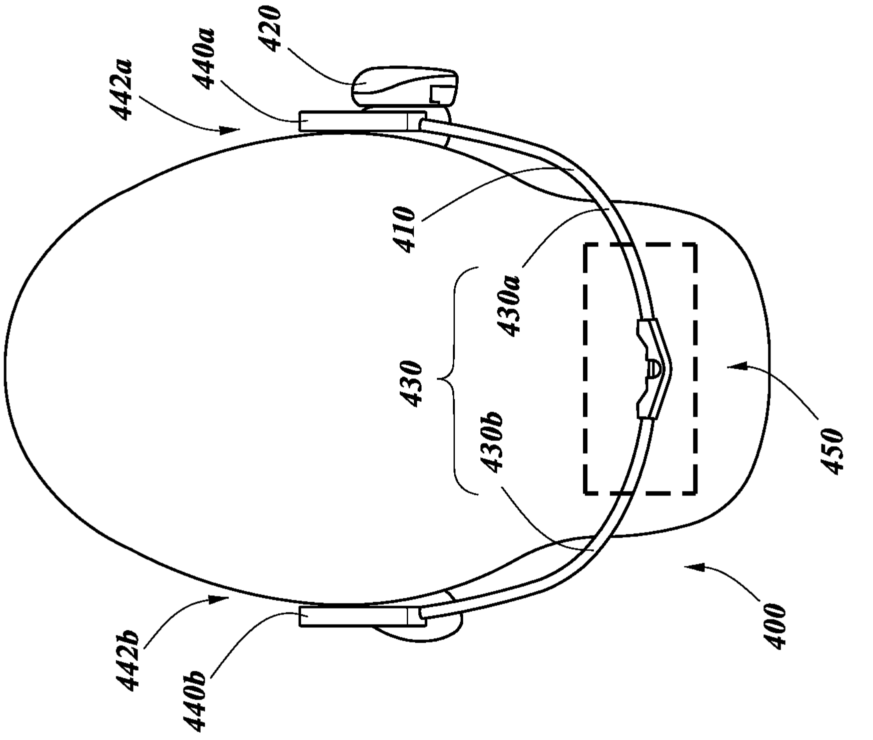
Figure 2E:
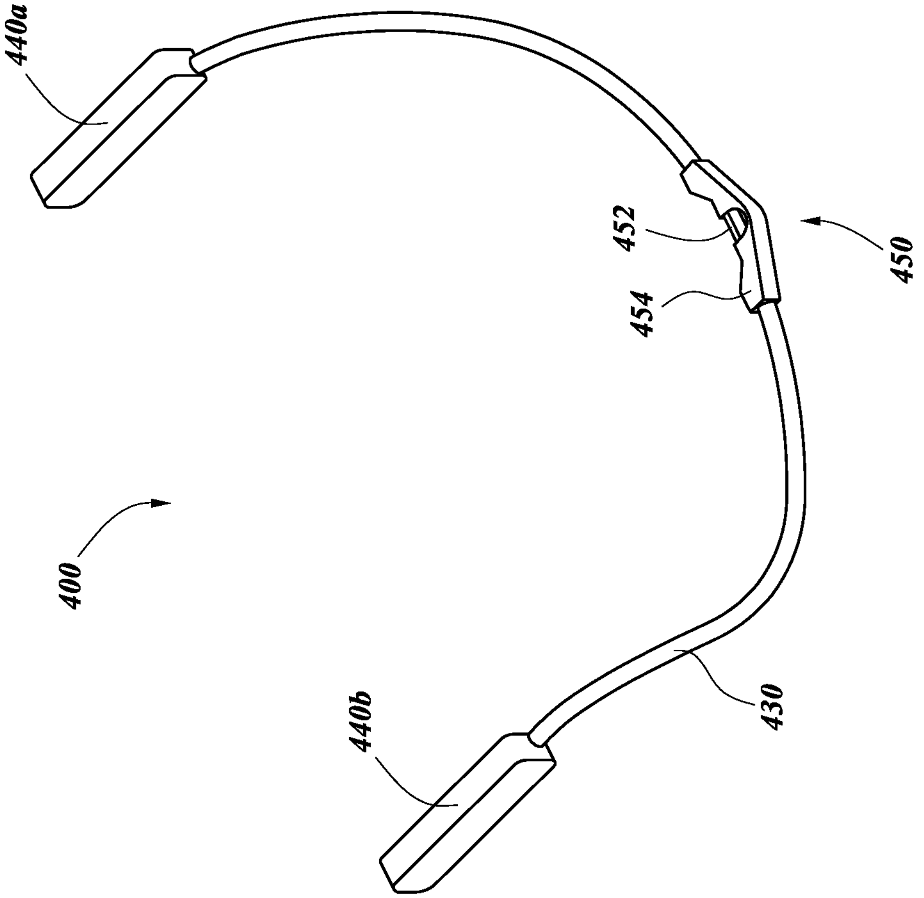

In certain embodiments, the support 410 and the at least one bone conduction device 420 are integral with one another. In certain other embodiments, the support 410 and the at least one bone conduction device 420 are modular (e.g., can be relatively easily attached to one another and relatively easily detached from one another during normal use, repeatedly if desired). While FIGS. 2A-2C schematically illustrate an embodiment in which the support 410 is configured to be used in conjunction with a single bone conduction device 420 at one side of the recipient's head (e.g., generating and providing acoustic vibrations to one of the recipient's middle ears 102), in certain other embodiments, the support 410 is configured to be used in conjunction with two single bone conduction devices 420 at opposite sides of the recipient's head (e.g., each generating and providing acoustic vibrations to a corresponding one of the recipient's two middle ears 102).

Figure 3:
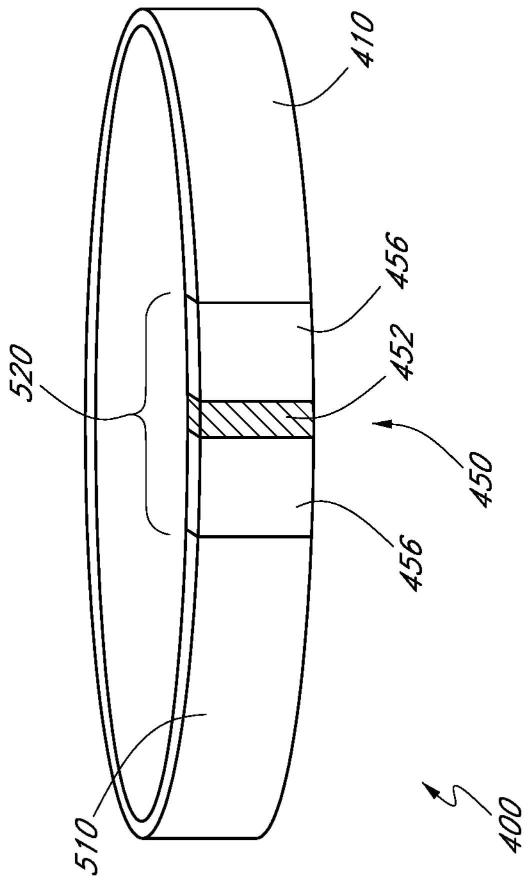
FIG. 3 schematically illustrates another example apparatus comprising an elastic portion in accordance with certain embodiments described herein.
Figure 4B:
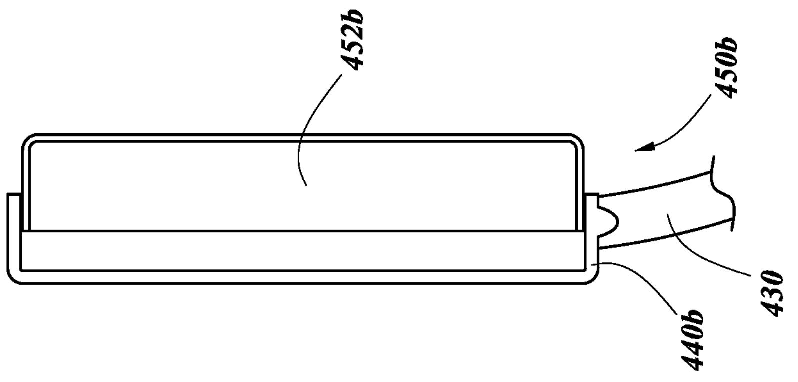
FIGS. 4A-4D schematically illustrate an example apparatus comprising two adjustment mechanisms in accordance with certain embodiments described herein.
Figure 4A:
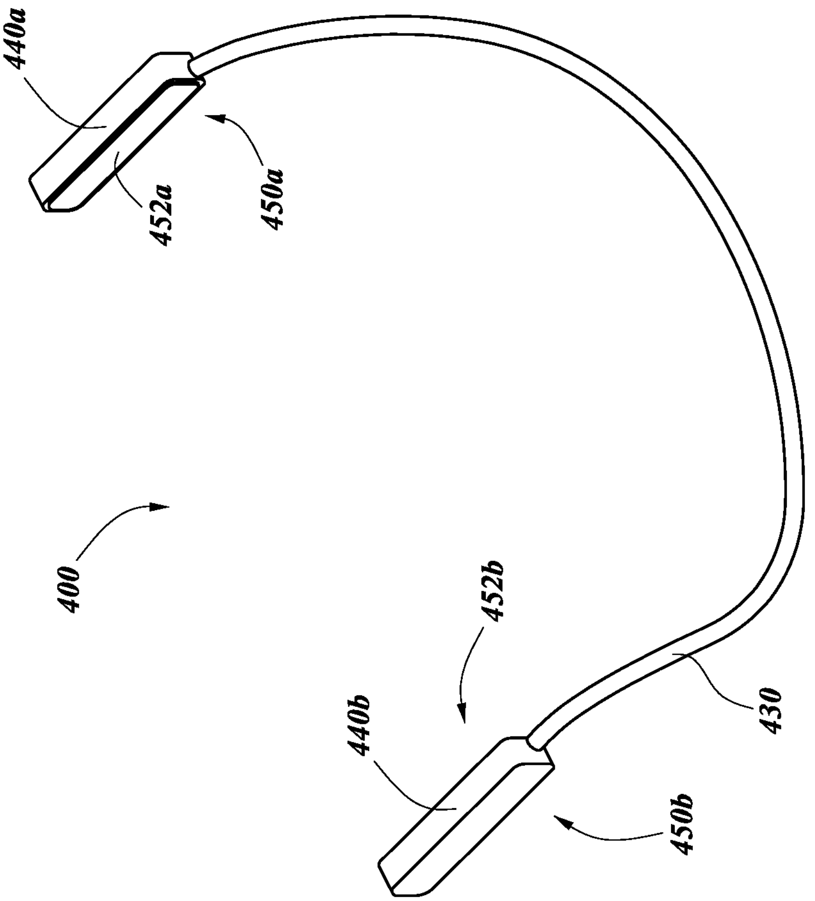
Figure 4D:
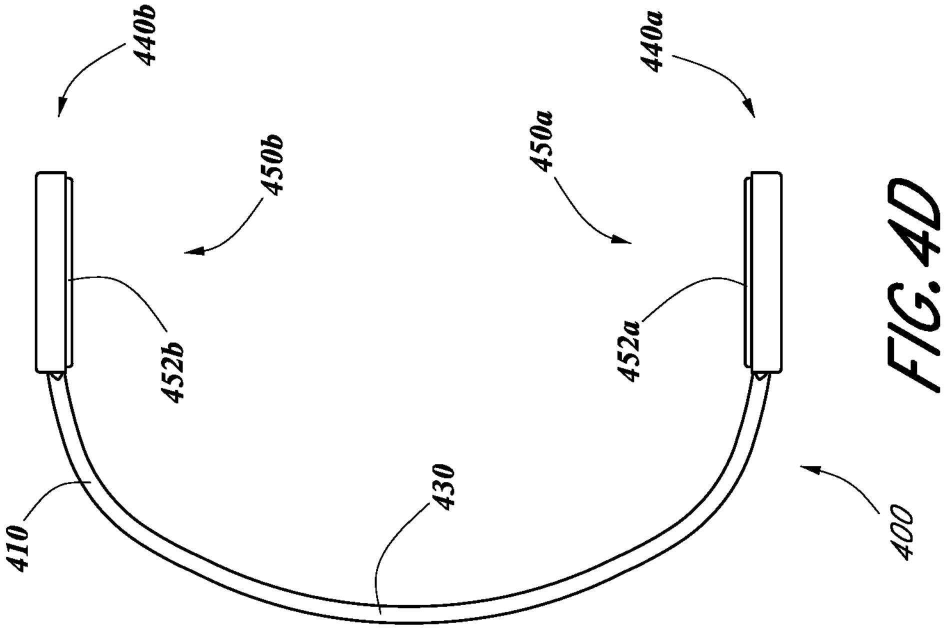
Figure 4C:
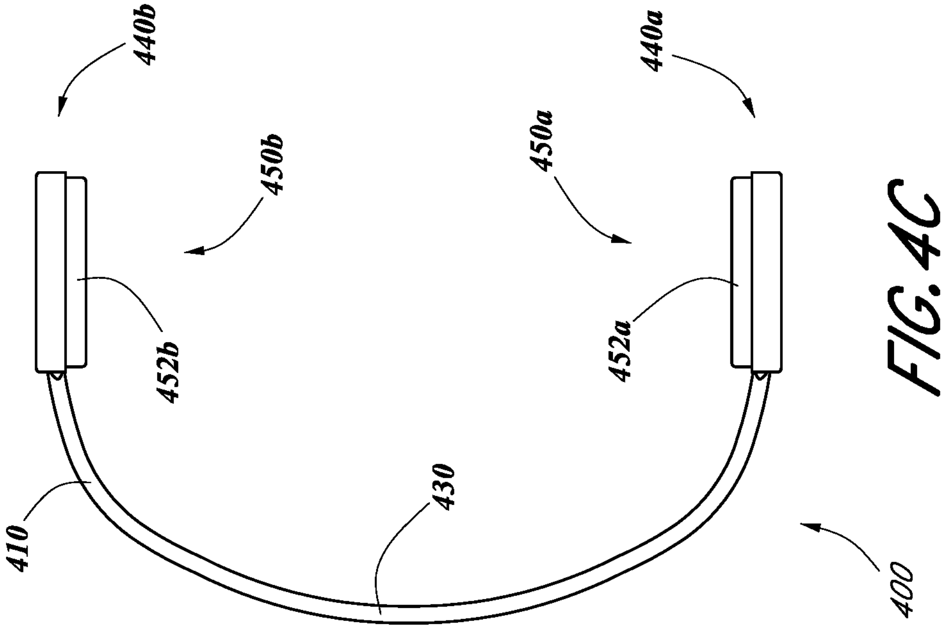

In certain embodiments, the support 410 (e.g., structure; frame; elongate body) comprises one or more materials and has sufficient mechanical rigidity to support the at least one bone conduction device 420 when the support 410 is worn by the recipient. For example, the support 410 can comprise one or more flexible portions 430 configured to generate the force pressing against the head upon the one or more flexible portions 430 being elastically deformed (e.g., upon the support 410 being worn on the head of the recipient). Examples of the one or more materials include but are not limited to: metals (e.g., aluminum), metal matrix composites, polymers (e.g., polyether ether ketone ("PEEK"), polyoxymethylene ("POM"), polyphenylsulfone ("PPSU")), plastics, reinforced plastics, silicone, silicone-based materials, ceramics, ceramic matrix composites, fiberglass-containing materials, and resin-based materials. For another example, as schematically illustrated in FIG. 3, the support 410 can comprise at least one elastic portion 510 (e.g., elastic band) configured to encircle at least a portion of the recipient's skull and at least one inelastic portion 520 (e.g., clasp) configured to provide manual adjustment of the amount of tension in the elastic portion 510 while the support 410 is being worn by the recipient.

The support 410 of certain embodiments is configured to contact the recipient's skin in one or more locations along the recipient's skull when the support 410 is worn by the recipient. For example, as schematically illustrated in FIGS. 2A-2C, the one or more flexible portions 430 can comprise first and second elongate portions 430*a*, 430*b* that extend around a portion of the recipient's head (e.g., the rear portion), and as schematically illustrated in FIGS. 4A-4D, a single flexible portion 430 can extend around the portion of the recipient's head. The support 410 can further comprise two end portions 440*a*, 440*b* at opposite ends of the one or more flexible portions 430 and that contact the recipient's skin at two locations 442*a*, 442*b* on opposite sides of the recipient's skull (e.g., at locations of the skin covering the left and right temporal bones; at locations of the skin covering the left and right mastoid bones; at locations above the left and right ears). While the first end portion 440*a* is configured to press against a first side of the head at the first location 442*a* and the second end portion 440*b* is configured to press against a second side of the heat at the second location 442*b*, the support 410 of certain embodiments can also contact the recipient's skin and/or hair at other locations on the recipient's head (e.g., a portion of one or both of the auricles 105, which can provide a stabilizing force to the support 410). In certain embodiments, the portions of the support 410 that are configured to contact the recipient's skin (e.g., end portions 440*a*, 440*b*) comprises a first material (e.g., metal) selected to provide a predetermined structural rigidity and a second material (e.g., silicone) covering (e.g., coating) the first material. The second material can be selected to provide a predetermined comfort level to the recipient when in contact with the recipient's skin.

In certain embodiments, the at least one bone conduction device 420 is configured to mate with a corresponding mating apparatus (not shown) of the support 410 and to provide auditory stimulation to the recipient (e.g., to transmit acoustic vibrations to the recipient's head) via the support 410. For example, as schematically illustrated in FIGS. 2A-2C, a portion of the at least one bone conduction device 420 (e.g., a coupling apparatus 140 of a component 300 comprising an actuator 206) is mechanically coupled to at least one of the end portions 440*a*, 440*b* of the support 410. The force generated by the support 410 is directly applied by the support 410 to the recipient's skin, and the acoustic vibrations generated by the at least one bone conduction device 420 are transmitted to the recipient's head through the support 410. In certain other embodiments, the force generated by the support 410 presses the at least one bone conduction device 420 directly against the recipient's head such that the at least one bone conduction device 420 directly provides auditory stimulation to the recipient (e.g., the acoustic vibrations are directly transmitted to the recipient's head without the acoustic vibrations being transmitted through the support 410). For example, the bone conduction device 420 can comprise a pad attached to the coupling apparatus 140 and configured to comfortably contact the recipient's skin, and the bone conduction device 420 can be held by the support 410 such that the pad presses directly against the recipient's head.

In certain embodiments, the support 410 is configured to actively adjust the force pressing against the head while the support 410 is worn by the recipient. For example, as described herein, the support 410 can comprise at least one adjustment mechanism 450 configured to adjust at least one of a length and a shape of the support 410, without mechanical manipulation of the at least one adjustment mechanism 450 (e.g., in a "hands-free" manner; without handling the support 410; without adjusting a hand-operated mechanism such as a ratcheting mechanism). In certain embodiments, the at least one adjustment mechanism 450 comprises an internal power source (e.g., battery) configured to provide power for operation of the at least one adjustment mechanism 450, while in certain other embodiments, the at least one adjustment mechanism 450 is configured to receive power from the bone conduction device 420 for operation of the at least one adjustment mechanism 450. In certain embodiments, the at least one adjustment mechanism 450 comprises an internal controller (e.g., microprocessor) configured to generate control signals for controlling operation of the at least one adjustment mechanism 450, while in certain other embodiments, the at least one adjustment mechanism 450 is configured to receive control signals from the bone conduction device 420 (e.g., via wired communication; via wireless communication) for controlling operation of the at least one adjustment mechanism 450.

In certain embodiments in which the support 410 comprises one or more flexible portions 430, the adjustment of the length and/or shape of the support 410 while the support 410 is worn by the recipient modifies an elastic deformation of the one or more flexible portions 430. The at least one adjustment mechanism 450 of certain such embodiments is positioned along the support 410 between the first end portion 440*a* and the second end portion 440*b* (e.g., equidistantly between the first and second end portions 440*a*, 440*b*; at a location offset from a center of the one or more flexible portions 430). For another example, as schematically illustrated in FIG. 3, the support 410 can comprise at least one adjustment mechanism 450 configured to adjust a tension force of the elastic portion 510.

In certain embodiments, the at least one adjustment mechanism 450 comprises at least one actuator 452 (e.g., configured to expand or contract in response to one or more control signals). The at least one actuator 452 can include one or more actuators selected from the group consisting of: at least one piezoelectric element, at least one hydraulic element, at least one pneumatic element, and at least one motor (e.g., screw-drive motor; stepper motor; ultrasonic motor; inchworm motor). For example, as schematically illustrated in FIGS. 2A-2E, the at least one adjustment mechanism 450 further comprises at least one hinge 454 mechanically coupled to the at least one actuator 452, and the at least one hinge 454 is configured to open or close (e.g., by bending; by pivoting) in response to the at least one actuator 452 expanding or contracting. By controllably opening and closing the at least one hinge 454, the at least one adjustment mechanism 450 modifies an orientation between the flexible portions 430 of the support 410, thereby modifying a shape of the support 410 and the amount of force applied by the support 410 to the recipient's skin. While the at least one adjustment mechanism 450 of the example apparatus 400 of FIGS. 2A-2E comprises a single actuator 452 and hinge 454, in certain other embodiments, the apparatus 400 comprises multiple actuators 452 and hinges 454 (e.g., a first actuator 452 and hinge 454 on a first side of the support 410 and a second actuator 452 and hinge 454 on a second side of the support 410).

For another example, as schematically illustrated in FIG. 3, the at least one actuator 452 is between and mechanically coupled to two portions 456 of the support 410 configured to move relative to one another (e.g., two portions of the elastic portion 510; two portions of the inelastic portion 520; a portion of the elastic portion 510 and a portion of the inelastic portion 520). By controllably expanding and contracting the at least one actuator 452, the at least one adjustment mechanism 450 modifies a length of the support 410 (e.g., the length between the two portions 456) and the amount of force applied by the elastic portion 510 of the support 410 to the recipient's skin. In certain embodiments, the at least one adjustment mechanism 450 can comprise a first adjustment mechanism configured to provide coarse adjustments (e.g., adjustments with large increments) and a second adjustment mechanism configured to provide fine adjustments (e.g., adjustments with small increments).

FIGS. 4A-4D schematically illustrate an example apparatus 400 comprising two adjustment mechanisms 450*a*, 450*b* in accordance with certain embodiments described herein. A first adjustment mechanism 450*a* is part of the first end portion 440*a* and a second adjustment mechanism 450*b* is part of the second end portion 440*b*. The first adjustment mechanism 450*a* comprises a first actuator 452*a* (e.g., piston) and the second adjustment mechanism 450*b* comprises a second actuator 452*b* (e.g., piston). By expanding the first and second actuators 452*a*, 452*b* (e.g., see FIG. 4C) while the support 410 is worn on the recipient's head, the force applied by the first and second end portions 440*a*, 440*b* to the recipient's skin is increased. Conversely, by contracting the first and second actuators 452*a*, 452*b* (e.g., see FIG. 4D) while the support 410 is worn on the recipient's head, the force applied by the first and second end portions 440*a*, 440*b* to the recipient's skin is decreased. In certain other embodiments, only one of the first and second end portions 440*a*, 440*b* comprises an actuator which is configured to expand and contract.

Figure 5B:
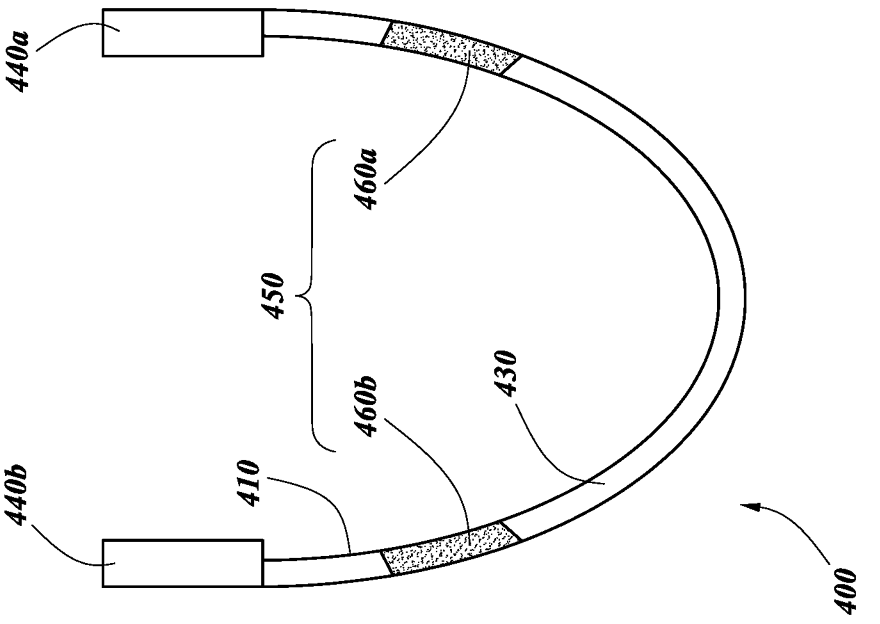
FIGS. 5A and 5B schematically illustrate two example apparatuses comprising at least one adjustment mechanism comprising at least one piezoelectric bending mechanism in accordance with certain embodiments described herein.
Figure 5A:
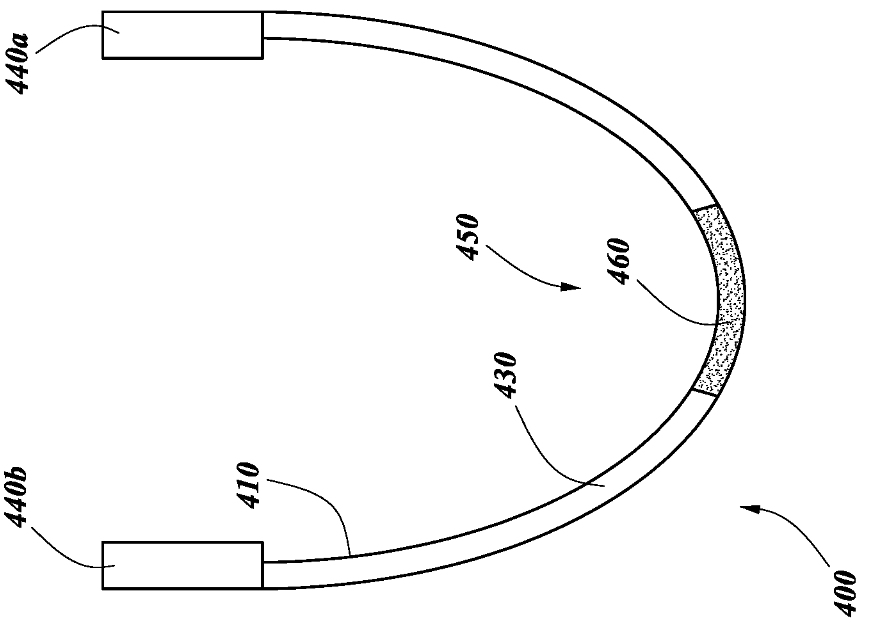
Figure 5D:
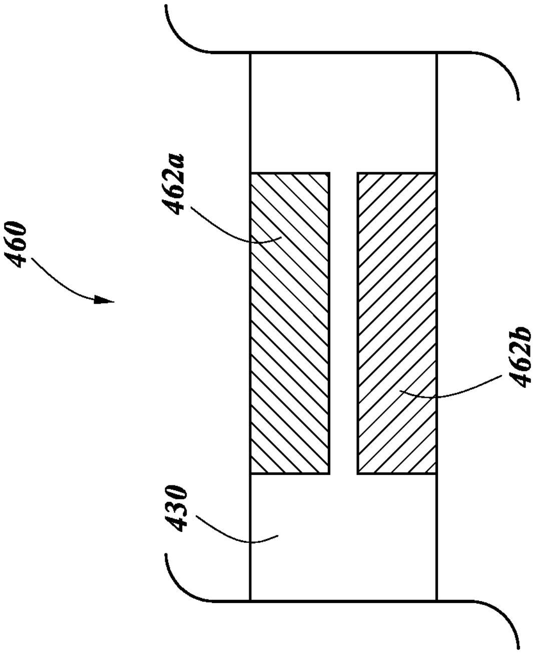
FIGS. 5C and 5D schematically illustrate two example piezoelectric bending mechanisms in accordance with certain embodiments described herein.
Figure 5C:
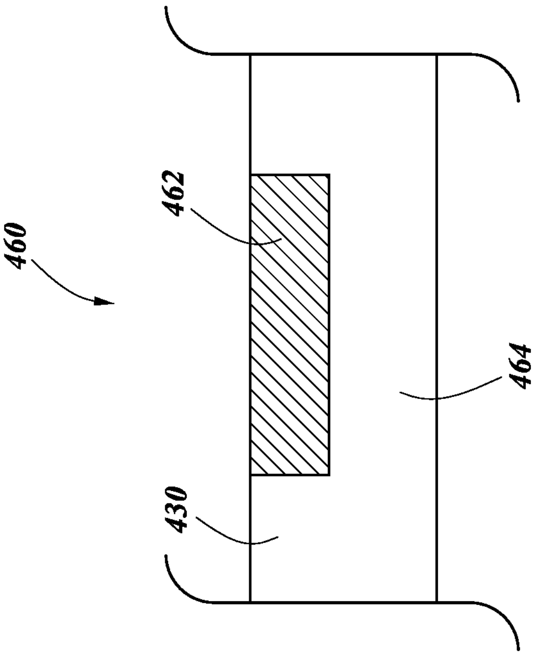

FIGS. 5A and 5B schematically illustrate two example apparatuses 400 comprising at least one adjustment mechanism 450 comprising at least one piezoelectric bending mechanism 460 in accordance with certain embodiments described herein. FIG. 5A schematically illustrates one piezoelectric bending mechanism 460 positioned between (e.g., equidistantly) the first and second end portions 440*a*, 440*b*. FIG. 5B schematically illustrates two piezoelectric bending mechanisms 460*a*, 460*b* positioned along the support 410 (e.g., on portions of the elongate portion 430 positioned at opposite sides of the recipient's head). The piezoelectric bending mechanism 460 is mechanically coupled to the flexible portions 430, and is configured to bend (e.g., either towards the head or away from the head) in response to control signals, thereby modifying an orientation between the flexible portions 430 of the support 410, a shape of the support 410, and the amount of force applied by the support 410 to the recipient's skin FIGS. 5C and 5D schematically illustrate two example piezoelectric bending mechanisms 460 in accordance with certain embodiments described herein. The piezoelectric bending mechanism 460 of FIG. 5C comprises a single piezoelectric element 462 alongside a non-piezoelectric portion 464 of the bending mechanism 460 (e.g., a unilayer configuration), the piezoelectric element 462 configured to expand and contract in response to control signals, thereby bending the bending mechanism 460 and modifying the force applied by the first and second end portions 440*a*, 440*b* while the support 410 is worn by the recipient. The piezoelectric bending mechanism 460 of FIG. 5D comprises a pair of piezoelectric elements 462*a*, 462*b* positioned alongside one another (e.g., a dual layer configuration). For example, one piezoelectric element 462*a* can be on a first side of the support 410 (e.g., a side closest to the recipient's head) and the other piezoelectric element 462*b* can be on a second side of the support 410 (e.g., a side farthest from the recipient's head). The piezoelectric elements 462*a*, 462*b* are configured to expand and contract in response to control signals such that when one piezoelectric element 462*a* expands, the other piezoelectric element 462*b* contracts and vice versa, thereby bending the bending mechanism 460 and modifying the force applied by the first and second end portions 440*a*, 440*b* while the support 410 is worn by the recipient.

Figure 6:
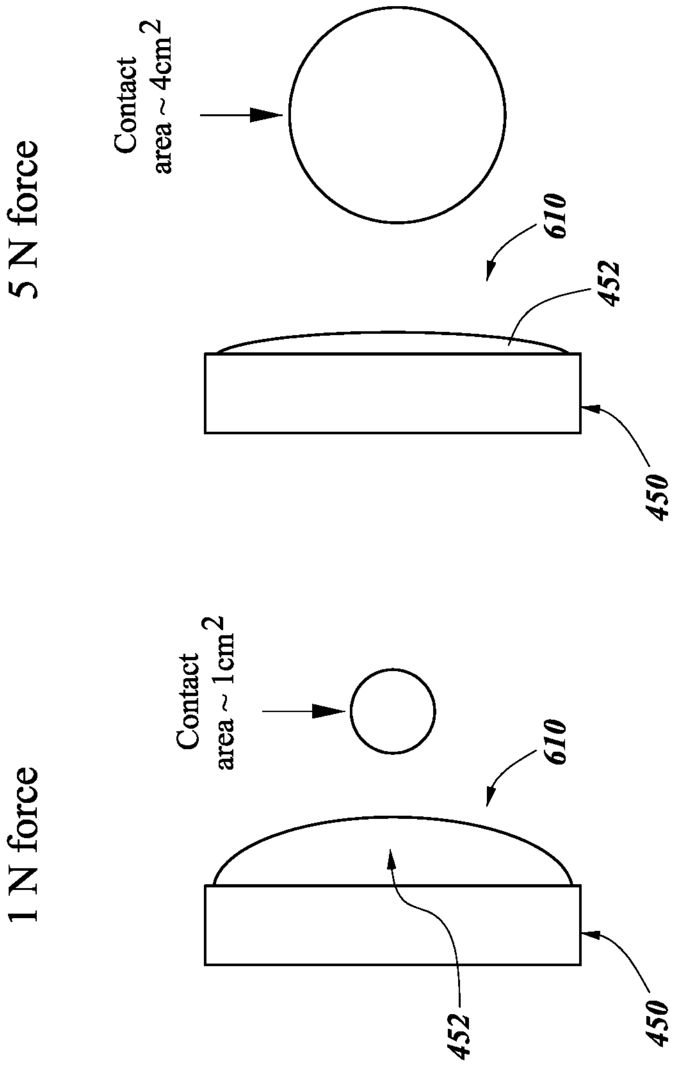
FIG. 6 schematically illustrates another example adjustment mechanism in accordance with certain embodiments described herein.

FIG. 6 schematically illustrates another example adjustment mechanism 450 in accordance with certain embodiments described herein. The example adjustment mechanism 450 is configured to modify a pressure applied to the recipient's skin in response to the modified force applied to the recipient's skin. The adjustment mechanism 450 comprises an actuator 452 that comprises an interface surface 610 that is configured to contact the recipient's skin. For example, the actuator 452 can comprise a soft, adaptive material (e.g., foam; incompressible fluid) contained in a reservoir or bladder that defines a shape of the interface surface 610. As shown on the left side of FIG. 6, when the applied force is at a first force value (e.g., 1 newton), the interface surface 610 pressing against the recipient's skin has a first shape, resulting in the contact area between the interface surface 610 and the recipient's skin having a first area value (e.g., 1 $cm^2$), and a first pressure (e.g., 1 newton/$cm^2$) applied to the recipient's skin. As shown on the right side of FIG. 6, when the applied force is at a second force value (e.g., 5 newtons) that is larger than the first force value, the interface surface 610 pressing against the recipient's skin has a second shape (e.g., flatter, less convex than the first shape), resulting in the contact area between the interface surface 610 and the recipient's skin having a second area value (e.g., 4 $cm^2$) that is larger than the first area value, and a second pressure (e.g., 1.25 newton/$cm^2$) applied to the recipient' skin. While the second pressure is higher than the first pressure, the ratio of the second pressure to the first pressure (e.g., 1.25:1) is less than the ratio of the second force value to the first force value (e.g., 5:1). Thus, certain embodiments described herein advantageously provide an increased force applied to the recipient's skin while the pressure applied to the recipient's skin is increased by a lesser degree. In certain other embodiments, the pressure applied can remain unchanged or reduced upon application of a higher force value.

In certain embodiments, the support 410 is configured to actively adjust the force pressing against the head in response at least in part to operational conditions detected while the support 410 is worn by the recipient. For example, the at least one adjustment mechanism 450 can be configured to adjust the at least one of a length and a shape of the support 410 in response to control signals generated while the support 410 is worn by the recipient, and the control signals can be generated in response to the detected operational conditions. In certain embodiments, the at least one adjustment mechanism 450 is in operative communication (e.g., wired communication; wireless communication) with the at least one bone conduction device 420 and at least some of the control signals are generated by the at least one bone conduction device 420 and received by the at least one adjustment mechanism 450. In certain other embodiments, the at least one adjustment mechanism 450 comprises one or more sensors (e.g., accelerometers) and at least some of the control signals are generated by the at least one adjustment mechanism 450.

In certain embodiments, the operational conditions include but are not limited to one or more of the following: motion of the recipient's head; location of the recipient; time of day; category of auditory information being provided to the recipient via the auditory stimulation (e.g., transmitted by the vibrations); and input received from the recipient. For example, the motion of the recipient's head can be monitored by one or more sensors (e.g., accelerometers) in the at least one bone conduction device 420 and/or the at least one adjustment mechanism 450. Control signals configured to instruct the at least one adjustment mechanism 450 to increase the force can be generated in response to the one or more sensors detecting accelerations larger than a predetermined threshold (e.g., due to rough housing, falls, and/or other activities by the recipient) that could adversely affect the retention of the support 410 on the recipient's head and/or the transmission of the auditory stimulation (e.g., vibrations) from the at least one bone conduction device 420 to the recipient.

For another example, the location of the recipient can be monitored by one or more sensors (e.g., global positioning system sensors) in the at least one bone conduction device 420 and/or the at least one adjustment mechanism 450. Control signals configured to instruct the at least one adjustment mechanism 450 to increase the force can be generated in response to the one or more sensors detecting that the recipient is at a location (e.g., selected by the recipient) at which better sound quality is warranted (e.g., in a lecture hall; at a concert or theater venue).

For another example, the time of day can be monitored by one or more clocks in the at least one bone conduction device 420 and/or the at least one adjustment mechanism 450. Control signals configured to instruct the at least one adjustment mechanism 450 to adjust the force can be generated in response to the one or more clocks detecting that the time of day is within one or more predetermined time periods (e.g., selected by the recipient). The force can be increased in time periods during which better sound quality is warranted (e.g., during daytime) and/or can be decreased in time periods during which better sound quality is not warranted (e.g., during bedtime).

For another example, the time period during which a force is above a predetermined force threshold can be monitored by one or more clocks, timers, or counters in the at least one bone conduction device 420 and/or the at least one adjustment mechanism 450. Control signals configured to instruct the at least one adjustment mechanism 450 to decrease the force can be generated in response to the one or more clocks detecting that the force has been above the predetermined force threshold for a time period longer than one or more predetermined time periods (e.g., selected by the recipient). By decreasing the force (e.g., intermittently) in this manner, certain embodiments can help prevent larger forces from being applied for excessively long periods of time which could otherwise result in injury to the recipient's skin. By monitoring the time period during which the force is above a predetermined force threshold, certain embodiments described herein can provide an estimate of the time period of active use of the bone conduction device 420 which can be provided to a pre-approved third party (e.g., a parent of a child recipient; a clinician; a cost reimbursement provider). In certain embodiments in which the recipient is allowed to temporarily override the predetermined force threshold (e.g., a force threshold corresponding to safe long-term usage), such monitoring can advantageously be used to determine whether the recipient is overusing the override option or to prevent the recipient from overusing the override option.

For another example, the category of the auditory information can be monitored by the at least one bone conduction device 420 and/or the at least one adjustment mechanism 450. Control signals configured to instruct the at least one adjustment mechanism 450 to increase the force can be generated in response to detecting that the auditory information is in one or more of the following categories: speech; music; information from streaming content (e.g., television), a telephone, and/or a telecoil (e.g., by detecting that the source of the auditory information is from a source different from a microphone of the bone conduction device 420); sounds indicative of dangerous conditions (e.g., sound of oncoming vehicle); and the recipient's name. Control signals configured to instruct the at least one adjustment mechanism 450 to decrease the force can be generated in response to detecting that the auditory information is in one or more of the following categories: noise (e.g., excessive noise above a predetermined threshold; wind sounds) and quiet (e.g., sound below a predetermined threshold). For example, the control signals can be generated by an environmental classifier that uses the output from one or more microphones to categorize the recipient's sound environment (e.g., speech in noise, speech in quiet, music, wind noise). The classifier can comprise a classification algorithm (e.g., a trained neural network) that is executed by a processor that is part of the at least one adjustment mechanism

450, the at least one bone conduction device 420 or another device (e.g., a mobile phone in wireless communication with the at least one adjustment mechanism 450). Each classifier category can be assigned a force that correlates with the perceived listening effort/listening difficultly expected in the corresponding environment. For example, a relatively high force can be applied when the classifier output corresponds to "speech in noise," whereas a relatively low force can be applied when the classifier output corresponds to "wind noise."

The specific operational conditions and/or their threshold parameters triggering the active adjustment of the force can be selected and/or adjusted in response to input received from the recipient, for example, from the recipient's mobile device (e.g., smartphone; tablet) running a corresponding software application and in wireless communication with the support 410 and/or the at least one bone conduction device 420. In certain embodiments, the operational conditions and/or their triggering threshold parameters can be overridden (e.g., temporarily) by the recipient. For example, the input received from the recipient can increase and/or decrease the force regardless of the detected operational conditions.

Figure 7:
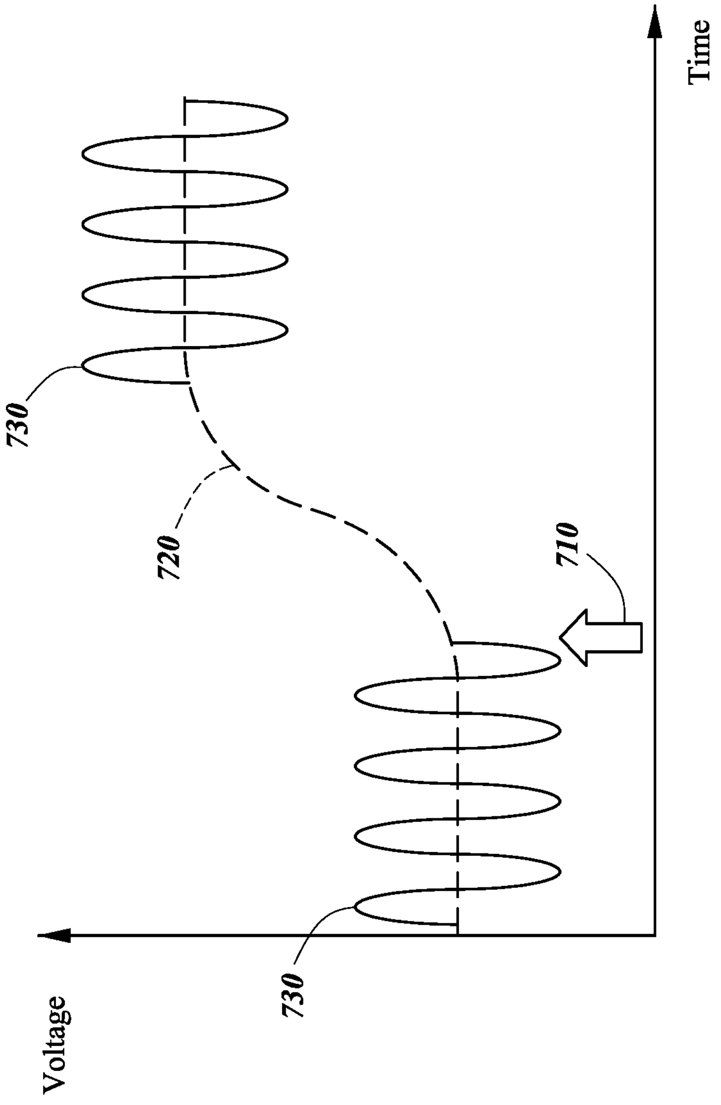
FIG. 7 is a plot showing voltage applied to at least one adjustment mechanism as a function of time to provide both the static component of the force and the vibrational component of the force in accordance with certain embodiments described herein.

In certain embodiments, the at least one adjustment mechanism 450 is configured to modify (e.g., actively adjust) a static component of a force applied by the at least one adjustment mechanism 450 in response to the control signals and to generate and apply vibrations indicative of auditory information to the recipient's skin. As used herein, the phrase "static component" refers to a component (e.g., a portion of a force; a portion of a voltage) which changes more slowly than does a component corresponding to the vibrations indicative of auditory information. In certain embodiments, the at least one adjustment mechanism 450 comprises at least one actuator 452 (e.g., piezoelectric element) which expands and contracts in response to a voltage applied to the at least one actuator 452. As schematically illustrated in FIG. 7, a static component of the force can be modified in response to control signals 710 (e.g., generated in response at least in part to operational conditions detected while the support 410 is worn by the recipient) by modifying a static component 720 of a voltage applied to the at least one actuator 452. In addition, the at least one actuator 452 can be driven by a non-static component 730 of the voltage applied to the at least one actuator 452 to generate the vibrations indicative of auditory information. That is, in some embodiments, the at least one adjustment mechanism 450 is configured to superimpose a dynamic signal (e.g., a signal representative of audio content with frequencies within the audible range) with a static signal (e.g., having no frequency component or a frequency component that is outside the audible frequency range) to generate an instantaneous drive signal for at least one actuator 452. In certain such embodiments, the at least one actuator 452 is configured to generate a composite force, representative of the instantaneous drive signal, that comprises audio content (e.g., the dynamic signal) and a transmission force (e.g., the static signal) that influences the transmission of the dynamic force to the skull of the recipient. As shown in FIG. 7, the instantaneous signal (and corresponding composite force) comprise distinct components. By utilizing the at least one adjustment mechanism 450 to provide both the static component of the force and the vibrational component of the force, certain such embodiments can advantageously utilize the stiffness of the support 410 to generate the vibrations indicative of auditory information while avoiding use of a separate actuator (e.g., a vibration generator comprising a counter-mass).

Certain embodiments comprise a non-surgical bone conduction device comprising at least one actuator and a signal processor, wherein the signal processor is configured to produce a drive signal for the at least one actuator. The drive signal comprises: (i) a first signal component that fluctuates at frequencies within the audible range, and (ii) a second signal component that does not fluctuate or fluctuates at frequencies outside the audible range. In certain embodiments, the actuator is configured to provide a compressive force to retain the bone conduction device of the head of a recipient and/or transmit vibrations to the recipient's skull to evoke a hearing percept. In certain such embodiments, the actuator can be configured to modulate substantially all of the compressive force applied by the bone conduction device to the recipient's skull (e.g., the bone conduction device can be configured to not apply any force in the absence of a static clamping force generated by the actuator). In certain embodiments, the bone conduction device comprises a resilient frame that retains the bone conduction device on the skull of a recipient, but applies insufficient force to transit vibrations (e.g., the frame does not facilitate transmission of vibrations), in the absence of a clamping force from the actuator.

Figure 8A:
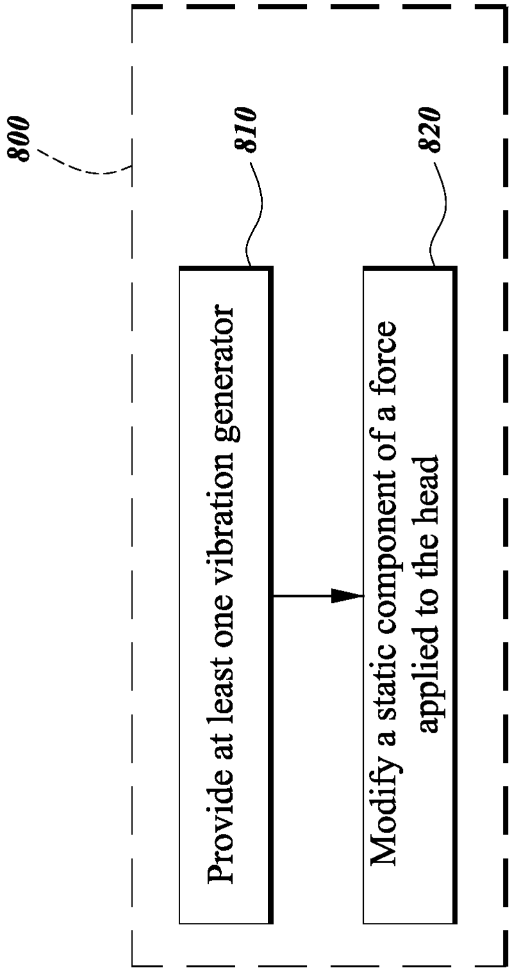
FIGS. 8A and 8B are flow diagrams of two examples of a method in accordance with certain embodiments described herein.
Figure 8B:
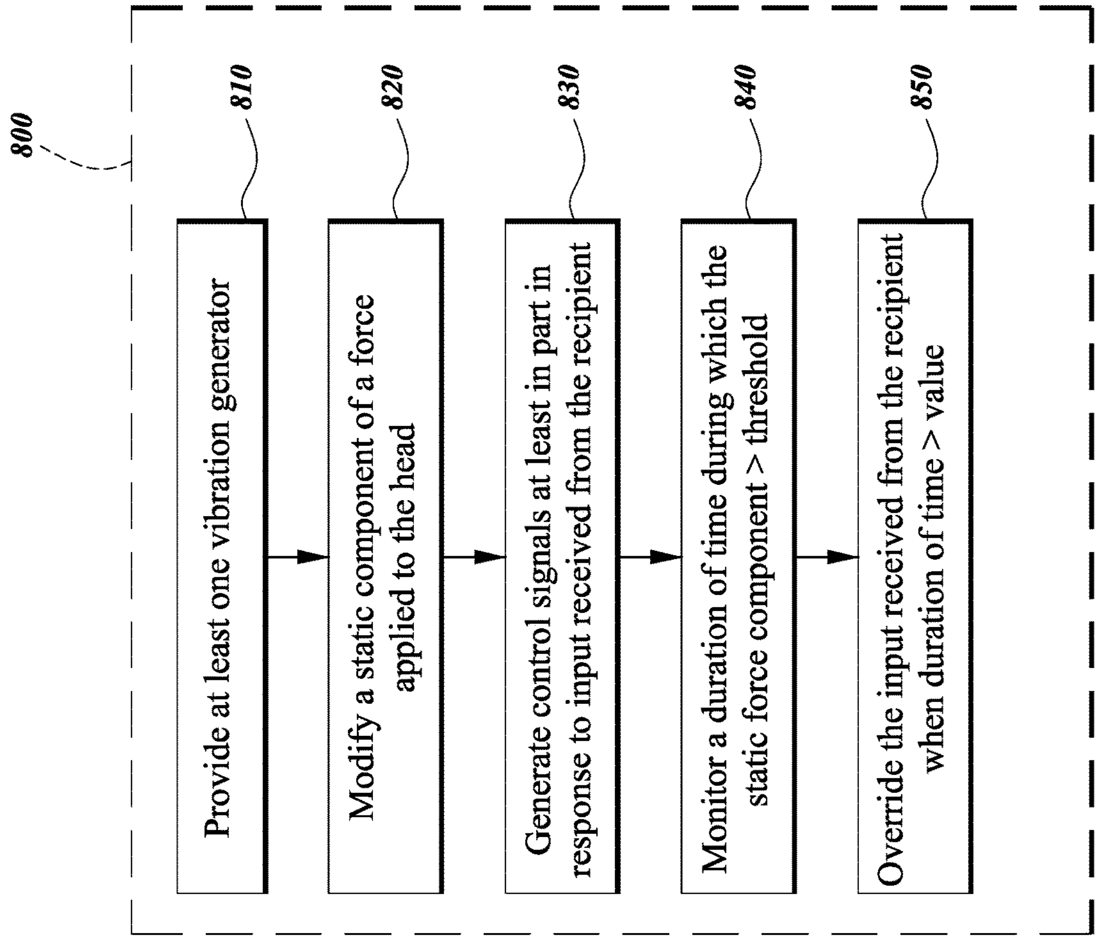

FIGS. 8A and 8B are flow diagrams of two examples of a method 800 in accordance with certain embodiments described herein. In an operational block 810, the method 800 comprises providing at least one vibration generator (e.g., at least one bone conduction device 420) configured to be worn on a head of a recipient and to transmit vibrations indicative of auditory information. In an operational block 820, the method 800 further comprises modifying a static component of a force applied by the at least one vibration generator to the head in response to control signals while the at least one vibration generator is worn by the recipient.

In certain embodiments, the method 800 further comprises detecting one or more conditions of operation of the at least one vibration generator and generating the control signals at least in part in response to the detected one or more conditions of operation. The detected one or more conditions of operation comprise one or more of the following: motion of the head; the auditory information being in at least one category (e.g., at least one of: speech; music; information from streaming content, a telephone, and/or a telecoil; noise; sounds indicative of dangerous conditions; the recipient's name). Modifying the static component of the force in certain embodiments comprises increasing the static component in response to control signals indicative of a first set of the one or more conditions of operation (e.g., a set of conditions of operation warranting better sound quality) and decreasing the static component in response to control signals indicative of a second set of the one or more conditions of operation (e.g., a set of conditions of operation not warranting better sound quality).

In certain embodiments (see, e.g., FIG. 8B), the method 800 further comprises generating the control signals at least in part in response to input received from the recipient in an operational block 830, monitoring a duration of time during which the static component of the force is over a predetermined threshold in an operational block 840, and overriding the input received from the recipient when the duration is greater than a predetermined value in an operational block 850.

While the example apparatus 400 has been described herein with regard to non-invasive or non-surgical bone conduction devices, other types of auditory prostheses may be used in conjunction with certain embodiments described herein. For example, for an cochlear implant auditory prosthesis comprising an external sound processor having a communication coil, the support 410 of certain embodiments described herein can be used to provide the retention force holding the external sound processor device and its communication coil in proximity to an implanted communication coil of the cochlear implant auditory prosthesis to provide sufficient coupling between the external and internal communication coils regardless of changes of the skin flap thickness of the skin overlaying the internal communication coil. Certain such embodiments advantageously avoid using magnets to supply the retention force and changing the magnet within the external sound processor device to account for changes of the skin flap thickness.

It is to be appreciated that the embodiments disclosed herein are not mutually exclusive and may be combined with one another in various arrangements.

The invention described and claimed herein is not to be limited in scope by the specific example embodiments herein disclosed, since these embodiments are intended as illustrations, and not limitations, of several aspects of the invention. Any equivalent embodiments are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example embodiments disclosed herein, but should be defined only in accordance with the claims and their equivalents.

What is claimed is:

1. An apparatus comprising:

a support configured to be worn on a body portion of a recipient and to hold at least one device on the body portion, the at least one device configured to provide information to the recipient, the support configured to generate a force that presses against the body portion, to receive control signals from control circuitry, and to actively adjust the force in response to the control signals while the support is worn by the recipient.

2. The apparatus of claim 1, wherein the support comprises at least one actuator configured to generate and actively adjust the force, the force configured to clamp the at least one device to the body portion.

3. The apparatus of claim 1, wherein the control circuitry comprises one or more sensors configured to generate the control signals in response at least in part to at least one operational condition detected by the one or more sensors while the support is worn by the recipient.

4. The apparatus of claim 3, wherein the at least one operational condition comprises movement of the body portion.

5. The apparatus of claim 3, wherein the at least one operational condition comprises location of the recipient and/or time of day.

6. The apparatus of claim 3, wherein the at least one operational condition comprises input received from the recipient.

7. The apparatus of claim 1, wherein the support comprises one or more flexible sections configured to generate the force upon the one or more flexible sections being elastically deformed, and the support is configured to actively adjust the force by modifying an elastic deformation of the one or more flexible sections.

8. An apparatus comprising:

an elongate body configured to be worn by a recipient;

circuitry configured to provide control signals; and at least one actuator configured to, in response to the control signals, adjust at least one of a length and a shape of the elongate body without handling or hand-operated adjustment of the at least one actuator.

9. The apparatus of claim 8, wherein the control signals are generated while the apparatus is worn by the recipient.

10. The apparatus of claim 8, wherein the at least one actuator comprises the circuitry.

11. The apparatus of claim 8, wherein the circuitry is configured to receive the control signals and to provide the control signals to the at least one actuator.

12. The apparatus of claim 8, wherein the control signals are generated in response to one or more of the following: motion of the recipient, location of the recipient, time of day, category of information transmitted by the vibrations, input received from the recipient.

13. The apparatus of claim 8, wherein the elongate body comprises one or more flexible portions configured to be elastically deformed when the elongate body is worn, a first end portion configured to press against a first site on the recipient, and a second end portion configured to press against a second site on the recipient.

14. The apparatus of claim 13, wherein the at least one actuator is positioned along the elongate body between the first end portion and the second end portion.

15. The apparatus of claim 13, wherein the at least one actuator is positioned equidistantly between the first end portion and the second end portion.

16. The apparatus of claim 8, wherein the structure further comprises an elastic band configured to wrap around a portion of the recipient and the at least one actuator is configured to adjust a tension force of the elastic band.

17. The apparatus of claim 8, wherein the at least one actuator is selected from the group consisting of: at least one piezoelectric element, at least one hydraulic element, at least one pneumatic element, and at least one motor.

18. The apparatus of claim 17, further comprising at least one hinge configured to open and close in response to the at least one actuator expanding or contracting.

19. A method comprising:

providing at least one device configured to be worn on a portion of a recipient and to provide information to the recipient; and in response to control signals generated by the at least one device, while the at least one device is worn on the portion, modifying a static component of a force applied by the at least one device to the recipient.

20. The method of claim 19, further comprising generating the control signals at least in part in response to input received from the recipient.

21. The method of claim 20, further comprising:

monitoring a duration of time during which the static component of the force is over a predetermined threshold; and overriding the input received from the recipient when the duration is greater than a predetermined value.

22. The method of claim 19, further comprising:

detecting one or more conditions of operation of the at least one device; and generating the control signals at least in part in response to the detected one or more conditions of operation.

23. The method of claim 22, wherein the detected one or more conditions of operation comprise motion of the portion.

24. The method of claim 19, wherein the force is a compressive force.

* * * * *